Mar. 3, 1925.

R. ARIUCHI

BEET TOPPER

Filed Nov. 12, 1923  2 Sheets-Sheet 1

1,528,391

INVENTOR
RIKIZO ARIUCHI
BY C. F. Blake
ATTY.

Patented Mar. 3, 1925.

1,528,391

UNITED STATES PATENT OFFICE.

RIKIZO ARIUCHI, OF PORTLAND, OREGON.

BEET TOPPER.

Application filed November 12, 1923. Serial No. 674,404.

*To all whom it may concern:*

Be it known that I, RIKIZO ARIUCHI, a citizen of Japan, and a resident of Portland, county of Multnomah, State of Oregon, have invented certain new and useful Improvements in Beet Toppers, of which the following is a specification.

My invention relates to beet toppers in general, and particularly to such toppers as are used to top the beets in the field before the harvesting thereof, the object of my invention being to provide such a device as is adjustable to the varying heights of the growing beets as the machine traverses the field, that will do the topping cleanly across the beet leaving no stubble, and that is adjustable for various spacing of the beet rows in the field.

I accomplish the above object by means of the construction illustrated in the accompanying drawings, which are a part of this application for Letters Patent, like characters of reference indicating like parts throughout the several views thereof, and in which.

Figure 1:
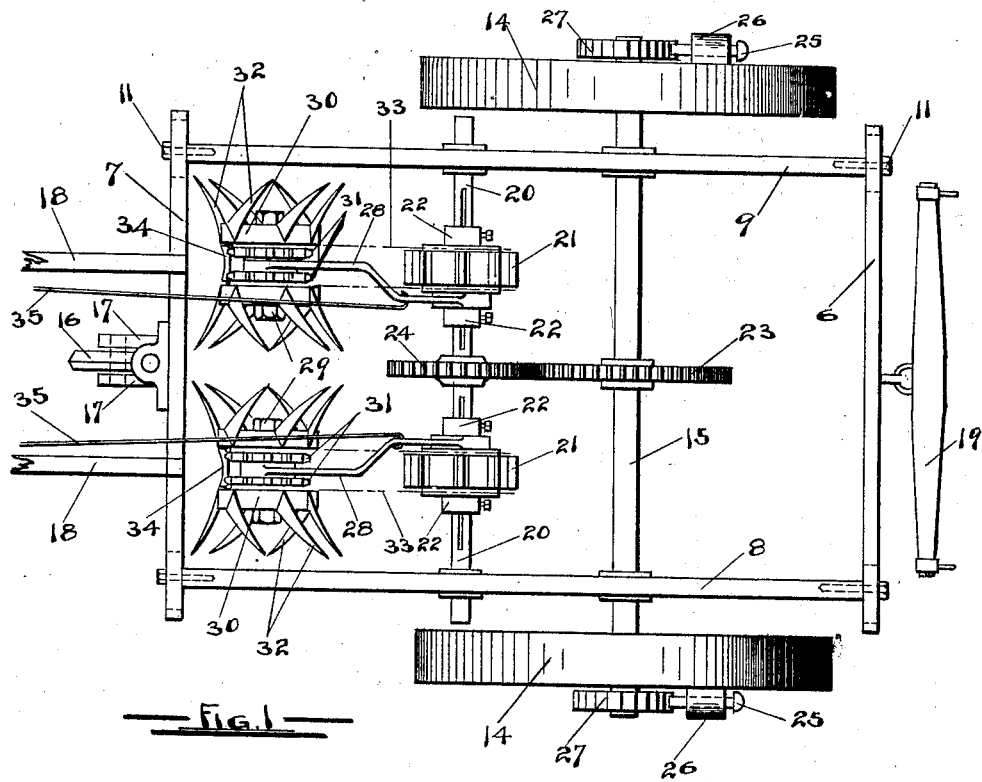
Fig. 1 is a plan view of my device.
Figure 2:
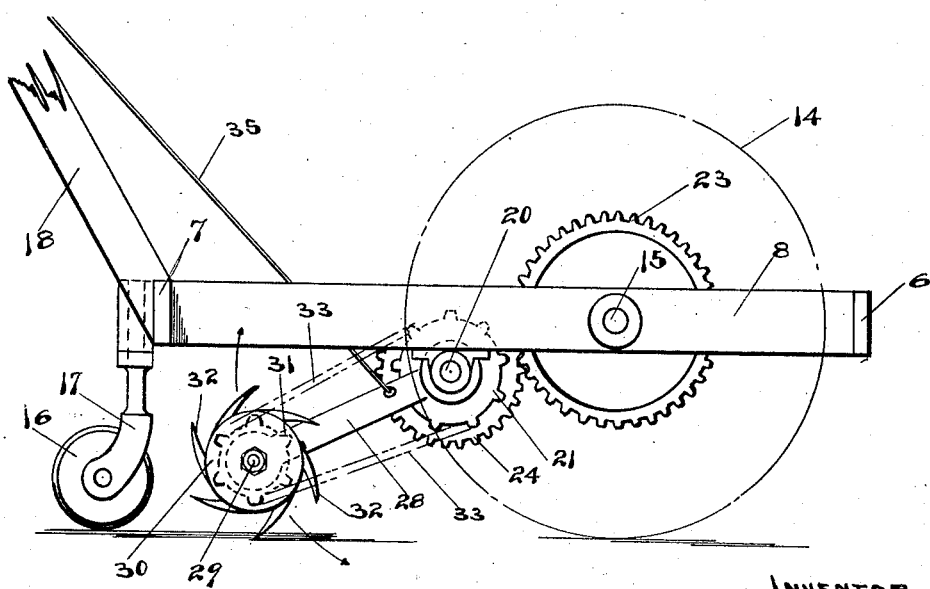
Fig. 2 is a side elevation of my device.

In general my device consists of a wheeled frame with driving mechanism operated from the wheels thereof, link suspended cutter heads having transversely extending cutting knives thereupon, a single chain drive adapted to drive adjacent cutter heads independently of each other, and cutter knives upon said chain.

The frame consists of end members 6 and 7 connected by side members 8 and 9, said side members being secured to said end members by bolts 11.

The frame is supported upon wheels 14 mounted freely upon a shaft 15 which is journaled in suitable journal boxes upon the side members 8 and 9 of the frame, and also upon a rearwardly disposed caster wheel 16 which is journaled in a forked member 17 rotatably mounted upon the rear end member 7. Suitable handles 18 are provided, attached to the rear end member 7, by which the machine may be guided down the beet rows, and the machine may be propelled in any desired manner, as by horses harnessed to the cross tree 19.

An auxiliary power shaft 20 is journaled in suitable journal boxes upon the side members 8 and 9 of the frame, and a pair of wide faced sprockets 21 are carried upon said shaft. Said sprockets are rotatably fixed upon said shaft, but are longitudinally slidable thereupon, and are secured in any desired position upon said shaft by set collars 22. The shaft 20 is driven from the shaft 15 by gears 23 and 24. The shaft 15 is driven from the wheels 14 by ratchet pins 25 mounted within suitable bosses 26 upon said wheels, and engaging with ratchet wheels 27 secured upon the shaft 15, as shown in Fig. 1. Said pins 25 may be withdrawn from contact with their respective ratchet wheels 27 when it is desired to transport the machine without operating the mechanism thereupon.

A pair of links 28 are pivotally mounted upon shaft 20, each respective to one of the wide faced sprockets 21, and mounted between its respective sprocket and one of the set collars 22, as shown in Fig. 1, and a cutter head of novel construction is mounted upon the rearward end of each of said links.

Secured upon the rearward end of each link 28 is a transversely disposed pin 29 extending upon each side its respective link, and rotatably mounted upon each extending portion of said pins is one member of the cutter head.

Figure 3:
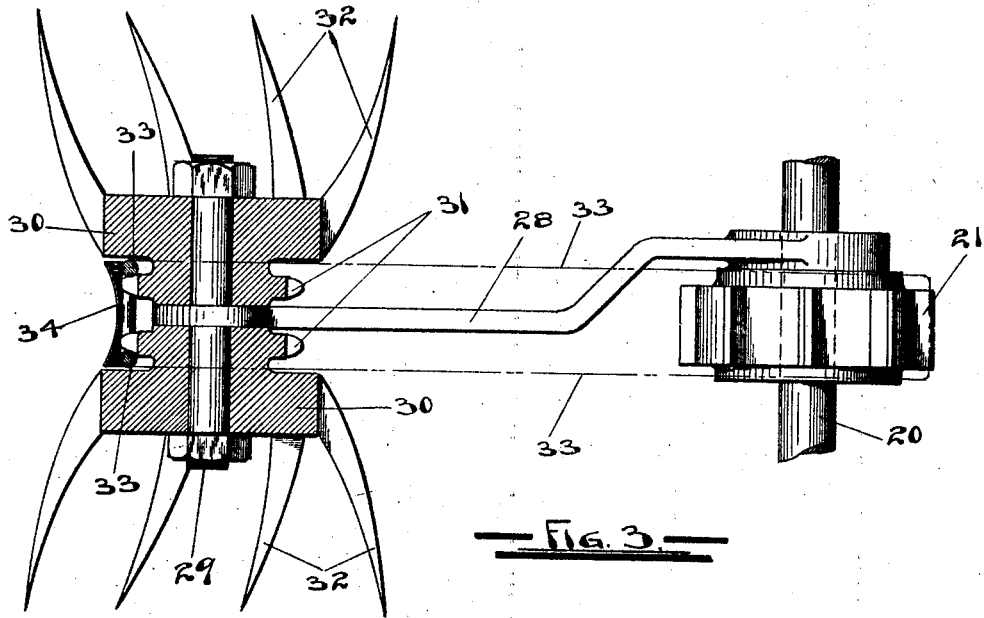
Fig. 3 is an enlarged view, partially in section, of the cutter heads and driving mechanism.
Figure 4:
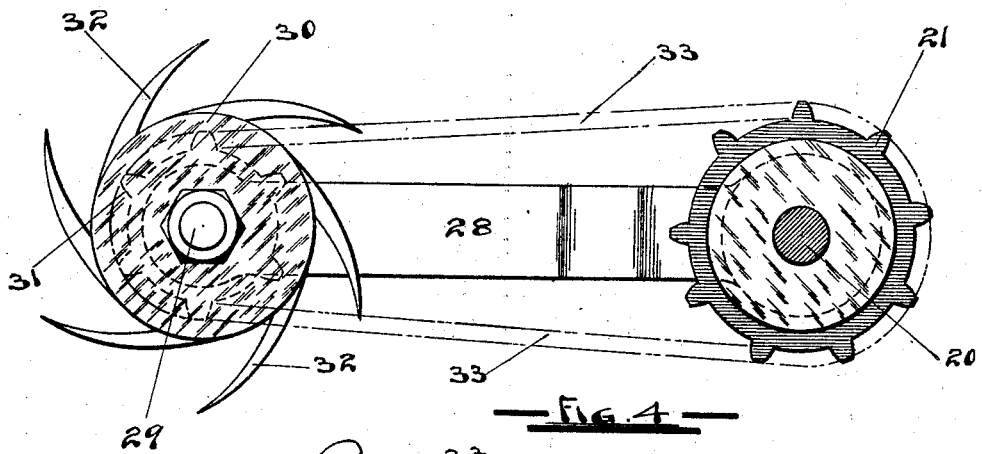
Fig. 4 is a side elevation of the subject matter of Fig. 3.
Figure 5:
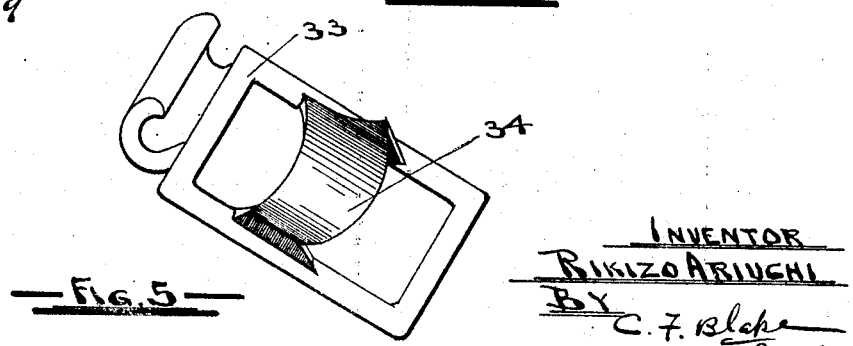
Fig. 5 is a perspective view upon an enlarged scale of one of the cutter head driving chain links with its cutting knife thereupon.

Said cutter head member comprises a hub 30 having sprocket teeth 31 thereupon, said sprocket teeth being disposed adjacent the respective link 28, and transversely disposed radially extending cutter knives 32, formed like a sunburst, upon the outer end of each of said hubs 30, as shown in detail in Figs. 3 and 4.

The cutter heads are driven by a chain 33 of sufficient width to coact simultaneously with the adjacent sprocket teeth 31 of the pair of cutter head members mounted upon a single link 28, and with the wide faced sprocket 21 respective to said chain. It is further necessary to provide a cutting device to occupy the space intervening between the inner or adjacent ends of the knives 32, so that the beet top may be severed from the beet in a clean manner leaving no stubble, This I accomplish by providing certain links of the chains 33 with cutter knives 34. Said knives 34 are curved so as to form a continuance of the cutting edges of the corresponding knives 32 upon opposite sides of the respective link 28, thus providing a substantially continuous cutting edge from tip to tip of corresponding knives 32, as shown in Figs. 1 and 3.

Members 35 are provided for raising or lowering each link 28 and its cutter head conveniently from the operator's position at the handles 18.

My invention may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a beet topper: a driven shaft; wide faced sprockets upon said shaft; rearwardly extending links mounted upon said shaft adjacent each of said wide faced sprockets; a rotatable cutter head member upon each side of said links at the rearward ends thereof; sprocket teeth upon each of said cutter head members; a chain coacting with the sprocket teeth upon each of said cutter head members and with the respective wide faced sprocket; transversely extending cutter knives upon each of said cutter head members; and cutter knives upon certain links of said chain, said chain cutter knives coacting with said head cutter knives to form continuous cutting edges from tip to tip of said latter knives.

2. In a beet topper: a rotatable cutter head comprising a pair of adjacently mounted hubs; sprocket teeth upon adjacent ends of said hubs; projecting cutter knives upon the opposite ends of said hubs; a single chain coacting simultaneously with the sprocket teeth upon each of said hubs; and cutters upon said chain.

3. In a beet topper: a pair of oppositely disposed rotatably mounted cutter heads; a single flexible member coacting with each of said heads to rotate them simultaneously; and cutters upon said flexible member.

4. In a beet topper: a pair of rotatable cutter heads; a link suspending said cutter heads; a flexible member simultaneously driving each of said cutter heads; and cutters upon said flexible member.

5. In a beet topper: a pair of rotatable cutter heads; adjacent sprockets upon said heads; a wide faced driving sprocket; and a chain mounted upon said wide faced sprocket and coacting with each of said cutter head sprockets.

6. In a beet topper: a pair of adjacently mounted rotary cutter heads; axially projecting cutters upon each of said heads; mechanism for simultaneously driving each of said heads; and cutters upon said driving mechanism; said latter cutters coacting with said former cutters to constitute a plurality of substantially continuous cutting edges.

In witness whereof I claim the foregoing as my own I hereunto affix my signature in the presence of two witnesses.

Portland, Oregon, Nov. 22, 1922.

RIKIZO ARIUCHI.

Witnesses:
L. J. ROBINSON,
C. F. BLAKE.